United States Patent [19]
Klüppel et al.

[11] Patent Number: 4,807,137
[45] Date of Patent: Feb. 21, 1989

[54] ARRANGEMENT FOR THE GENERATION OF A TRIGGER PULSE

[75] Inventors: Klemens Klüppel, Neuenrade; Albert Stübs, Lüdenscheid, both of Fed. Rep. of Germany

[73] Assignee: Atlas Fahrzeugtechnik GmbH, Werdohl, Fed. Rep. of Germany

[21] Appl. No.: 782,410

[22] Filed: Oct. 1, 1985

[30] Foreign Application Priority Data

Oct. 8, 1984 [DE] Fed. Rep. of Germany ....... 3436907

[51] Int. Cl.$^4$ ............................. F02P 5/04; F02P 5/15
[52] U.S. Cl. ............................. 364/431.04; 123/416; 123/418
[58] Field of Search ............ 364/431.05, 431.03, 364/431.04; 123/416, 417, 418; 307/268, 269, 609; 328/55, 56

[56] References Cited

U.S. PATENT DOCUMENTS

| | | | |
|---|---|---|---|
| 4,128,885 | 12/1978 | Valek et al. | 364/431.06 |
| 4,168,682 | 9/1979 | Gartner et al. | 364/431.04 |
| 4,225,925 | 9/1980 | Hattori et al. | 364/431.04 |
| 4,262,334 | 4/1981 | Monpetit | 364/431.04 |
| 4,328,779 | 5/1982 | Hattori et al. | 123/416 |
| 4,372,274 | 2/1983 | Takase | 364/431.04 |
| 4,379,239 | 4/1983 | Knuefelmann et al. | 123/609 |
| 4,466,405 | 8/1984 | Hattori et al. | 123/416 |
| 4,478,185 | 10/1984 | Obayashi et al. | 364/431.05 |
| 4,623,805 | 11/1986 | Flora et al. | 328/55 |

FOREIGN PATENT DOCUMENTS 0090740 10/1983 European Pat. Off. .

Primary Examiner—Felix D. Gruber
Attorney, Agent, or Firm—Mason, Kolehmainen, Rathburn & Wyss

[57] ABSTRACT

An arrangement for the generation of a trigger pulse for the ignition of an internal combustion engine. Crankshaft angle pulses representative of the rotational angle of the crankshaft are generated. The technical problem is an increase of the correction possibilities by the storage of all setting values for the ignition characteristic field and of the operating data for the internal combustion engine in the correction value memory. A speed-dependent temperature correction of every single trigger pulse is desired. Between the angle address counter and the correction value memory a hold circuit is inserted. For the angle address signal of the angle address counter a decoder is provided which delivers control signals upon occurence of certain angle addresses. An A/D converter is provided for the conversion of analog pressure and temperature values. For the digital pressure value and the digital temperature value each a hold circuit is provided, the outputs of which are connected to address inputs of the correction value memory. A pulse delay counter, the presetting of which is effected by a temperature correction signal, is connected to the output of the trigger counter.

5 Claims, 1 Drawing Sheet

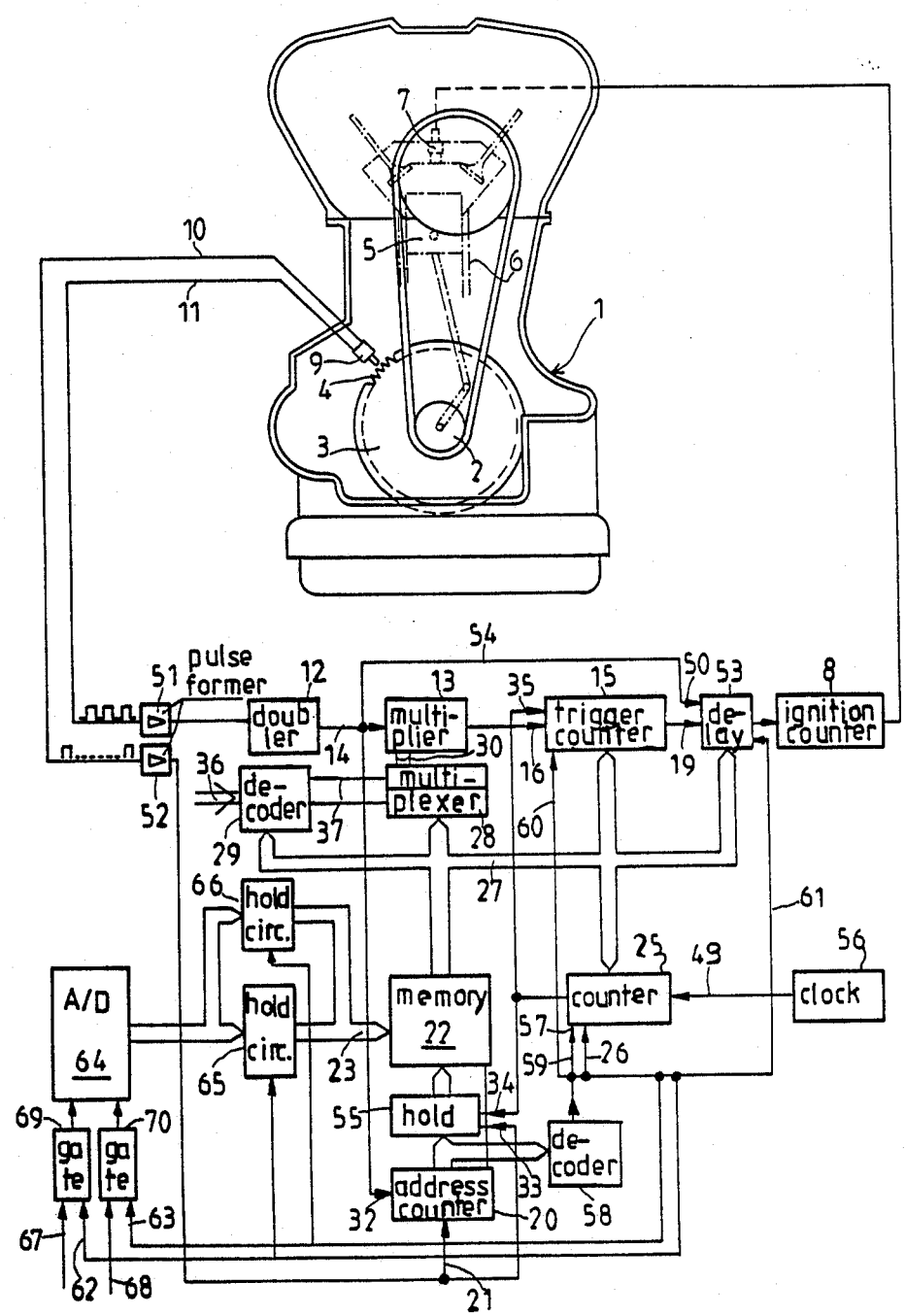

ARRANGEMENT FOR THE GENERATION OF A TRIGGER PULSE

BACKGROUND OF THE INVENTION

1. Field of the Invention

The invention relates to an arrangement for the generation of a trigger pulse for the ignition of an internal combustion engine, said trigger pulse is delayed within a working cycle by a phase dependent upon the rotational speed and other characteristic quantities in regard to a reference phase, whereby, taking the reference phase as basis, in addition to a reference pulse, crankshaft angle pulses representative of the rotational angle of the crankshaft are generated, which are fed into an angle address counter, on the output of which, on angle address lines, a multi-bit address signal assigned to the specified angle pulse being available, which signal is applied to a correction value memory, which provides, on its output, a digital correction signal, in addition, a time basis counter being provided for the allowance of a correction interval during each working cycle, and the angle pulses being applied to a controllable multiplier, the control input of which being controlled by the correction signal, and the output of which being applied to a trigger counter, which delivers a trigger pulse after reaching an overflow value.

2. Description of the Prior Art

Such an arrangement is described in the U.S. Pat. No. 4,379,239. By alteration of the pulse train, it is possible to adjust the phase of the ignition pulse dependent upon speed and other parameters. The correction of the pulse train is effected during a time period, which is a small fraction of the rotation period of the crankshaft. Within the time period alterations of the pulse train may be effected by the omission or insertion of pulses so that the overflow value of the trigger counter is reached for another angle phase. That means a corresponding adjustment of the time of ignition. During the time period the angle pulses are omitted, are counted singly or multiply according to the correction values respectively. In addition, for the correction value memory N-bit pressure inputs exist so that also a pressure-dependent selection of the correction values is possible. In this manner it is possible to provide a characteristic field with N pressure characteristic lines for the adjustment of the ignition pulse. It is also possible to alter the correction phase within the multiplexer dependent upon temperature.

SUMMARY OF THE INVENTION

It is an object of the invention to increase the correction possibilities by the storage of all the adjustment values for the ignition characteristic field and of the operating data of the internal combustion engine in the correction value memory. A temperature correction, dependent upon speed, of each individual trigger pulse is desired.

According to the invention this object is solved by the following features:

(a) between the angle address counter and the correction value memory a hold circuit is inserted, which holds the signal values of the angle address lines, with the exception of the highest-order angle address line, after expiration of the time basis;

(b) for the angle address signal of the angle address counter a decoder is provided, which delivers control signals for the energizing of the time basis counter if specific angle addresses are present and for the energizing of converter and hold-steps as well as for the generation of transfer signals;

(c) an A/D converter is provided for the conversion of analog pressure and temperature values;

(d) for the digital pressure value and the digital temperature value in each case a hold circuit is provided, the outputs of which being connected to address inputs of the correction value memory;

(e) a pulse delay counter is connected with the output of the trigger counter, the pre-adjustment of said pulse delay counter is effected by a temperature correction signal.

The invention differs from the prior art in so far as the correction value memory provides the correction values not only during the time basis, but, in addition, contains all the preset values for the counters and additionally, in a further address group outside the time basis, correction values for a speed-dependent temperature correction of the ignition time. Furthermore, the operating values of the specific internal combustion engine are stored in the correction value memory. Thus all the operating data of an internal combustion engine are completely available in a single address memory. The stored values can easily and reliably be adapted to altered conditions. The storage of the operating data is very variable.

For the recalling of the operating values and for the control of the different functions the invention provides that the decoder recognizes transfer angle addresses for the transfer of the preset values and operating values for the internal combustion engine, stored in the correction value memory, into the different counters, an enabling angle address for the energizing of the time basis counter and angle address intervals for the analog-digital conversion of the temperature and pressure values, and delivers output signals on the specific output lines. Thereby different data, such as correction values, preset values for counters, information about closing angles, other system information and allowance of particular operating characteristic lines can be processed in an appropriate manner.

The pulses representative of the rotational angle of the crankshaft are applied to an address counter. The address counter generates a multi-bit address signal which is related to the rotational angle of the crankshaft. The address counter is coupled to a hold circuit wherein all but the most significant bit of the multi-bit address signal is stored. The most significant bit of the address signal and the remainder of the multi-bit address lines are applied to a memory device which provides correction values for the ignition signal as a function of the speed of the crankshaft and an engine operating parameter, such as temperature.

Due to the fact that after the expiration of the time basis the angle pulses are counted successively and uninfluenced, it is provided, that during the angle address interval for the conversion of the temperature value the same is converted in the A/D converter and is applied to the multi-bit input, and that with the conclusion of this angle address interval, by a transfer signal on the line, the correction value on the output lines of the correction value memory, is taken over into the pulse delay counter.

In a further angle address interval it is provided that during the angle address interval for the conversion of the pressure value the same is converted in the A/D converter, and is held ready in the hold circuit on the multi-bit input for the following working cycle.

The correct value memory generates an 8-bit correction signal which is applied to the input of a multiplexer. Two bits are selected from the 8-bit correction signal by the multiplexer to adjust the ignition pulse timing.

BRIEF DESCRIPTION OF THE DRAWING

One embodiment of the invention will be described in the following with reference to the attached drawing, which shows, as a schematic view, an internal combustion engine with a block diagram of the arrangement.

DESCRIPTION OF THE PREFERRED EMBODIMENT

The FIG. shows, as a schematical representation, an internal combustion engine 1. On a crankshaft 2 a flywheel 3 is fixed, having a toothed rim 4 for the starter pinion. Pistons 5 coupled with the crankshaft 2 are slidable within cylinders 6. Within each cylinder head at least one spark plug 7 is provided, which receives from an ignition circuit 8 an ignition pulse.

An angle pulse generator 9 is provided opposite the toothed rim 4, which angle pulse generator 9 delivers on a line 11 angle pulses according to the passing of each tooth or tooth profile of the toothed rim 4 so that the pulse frequency of these angle pulses is proportional to the rotational speed of the flywheel 3 and, thus, of the crankshaft 2. On the other hand, on a line 10, according to the passing of a reference tooth of the toothed rim 4, a reference pulse is delivered, which corresponds to the reference phase of the rotation of the crankshaft 2. The reference tooth carries a special marking for the generation of this reference pulse. The pulses on the lines 10 and 11 are formed in pulse shapers 52 and 51 respectively.

The arrangement for the generation of a trigger pulse comprises a pulse step, especially a pulse doubler 12 which, if necessary, doubles the angle pulses. To the pulse doubler 12, a controlled multiplier 13 is connected which has a pulse input 14. The controlled multiplier 13 effects a pulse multiplication only in such a case if on a line 30 a corresponding control signal is applied. This control signal is a 2-bit signal so that four multiplicators can be represented according to the desired multiplication. The controlled multiplier 13 may gate the incoming pulses single, doubled, or multiplied by other factors. The output pulses of the controlled multiplier 13 are applied to a counting input 16 of a trigger counter 15. An enable-input 35 of the trigger counter 15 is controlled by the leading edge of a time basis pulse.

The trigger counter 15 delivers on the line 19 a trigger pulse, if the overflow value is reached. The line 19 leads to the enable-input of a pulse delay counter 53. A line 54, which carries the angle pulses of the pulse step 12, leads to the counting input 50 of the pulse delay counter 53. The ignition circuit 8 is arranged after the pulse delay counter 53, which ignition circuit 8 generates immediately the ignition pulse for the spark plug 7. In this case one ignition circuit 8 for the spark plugs of the further cylinders may be derived and distributed from the one ignition pulse in a known manner.

The output pulses of the pulse doubler 12 are also applied to an angle address counter 20 having a reset input 21. On the output of the angle address counter 20 in each case in compliance with the counting state a multi-bit address signal is held ready, which indicates immediately the angle or the phase of the rotary motion.

The multi-bit address signal, in the case of the embodiment an 8-bit address signal, applies, via a hold circuit 55, the address input of a correction value memory 22. Only the seven lower order bits of the eight bit address signal are applied to the hold circuit 55 while the highest order bit is applied to the correction memory 22. A reference pulse from the reference pulse shaper 52 is applied to an inhibiting input 33 of the hold circuit 55. A time base signal from the time basis counter 25 is applied to an inhibiting input 34 of the hold circuit 55 to inhibit the hold circuit 55 upon detection of the rear edge of the time basis signal. The correction value memory 22 contains in the individual address places multi-bit correction values, which are associated with the angle addresses; that will be described in detail later on. The correction value memory 22 comprises a further multi-bit input 23, through which load-dependent or pressure-dependent address signals may be fed in.

A preadjustable time basis counter 25 has a counting input 49, which is activated by a clock oscillator 56, as well as enable-input 26 so that the time basis counter 25 counts the clock pulses in each case after the occurence of an energizing signal, and, till an overflow value is reached, delivers an output signal of a preset period of time for the determination of the said time basis, the leading edge and rear edge of which are utilized. The input 57 is energized for a specific angle value as decoded by the decoder 58. The input 57 controls the transfer of specific data from the memory device 22 into the counter 25.

A decoder 58, which is responsive to the multi-bit address signal representative of the rotational angle of the crankshaft, is connected to the angle address counter 20 by way of the bus 27. Depending on the specific rotational angle of the crankshaft the output lines 59 to 63 of the decoder 58 are applied to transfer inputs and enable inputs of the counters and hold circuits and control the transfer of the preset values into the specific counters and the function of the hold circuits during the different intervals of a working cycle. The line 59 applies also the enable-input 26 of the time basis counter 25 so that the decoder 58 determines the beginning of the time basis according to a certain angle address.

On the output of the correction value memory 22 multi-bit correction signals are available on the data bus 27. In the case of this embodiment, they are 8-bit correction signals. Due to the fact that from the total number of the 8-bits normally just a small portion is required, within the multi-bit correction signals subgroups may be utilized, which are associated with different characteristic line fields and are activated via a multiplexer 28. The activation of the multiplexer 28 is effected via decoder 29, which also enables an external input via the inputs 36. Corresponding control signals for the multiplexer 28 are available on the selection line 37. The data bus 27 is also led to the time basis counter 25 and the trigger counter 15, for presenting the preset values.

On the input of the multiplexer 28 a 8-bit signal is applied. In the multiplexer a 2-bit group is selected from the 8-bit signal and is presented on the lines 30. The lines 30 are connected to a decoding step, not shown in detail, of the controlled multiplier 13. The outputs of decoding step control the multiplication. By a 2-bit signal on the lines 30 consequently four multiplicators can be encoded for the multiplication, e.g. the multiplicators 0, 2, 4, 6. The output pulses of the controlled multiplier appear via the counting input 16 of the trigger counter 15.

An A/D converter 64 is utilized for the conversion of analog pressure values, which appear on the line 67, and of analog temperature values, which appear on the line 68. The pressure values may represent e.g. the suction pipe pressure, and the temperature values may represent the cooling water temperature of the engine. Other engine characteristic values are also possible. The lines 67 and 68 are each connected via gates 69 and 70 to the A/D converter 64. The gates 69 and 70 are activated by the decoder 58 via lines 62 and 63. The line 62 carries a H-level during the angle address interval, associated with the pressure conversion, and the line 63 during the angle address interval, associated with the temperature conversion. In each case during the said intervals the A/D converter 64 is effective and converts the incoming analog voltages into N-bit signals on the output lines. These N-bit signals are taken over each with the expiration of the said angle address intervals by transfer signals of the decoder 58 into hold circuits 65 and/or 66, respectively. Further control signals of the decoder 58 secure a presentation of the temperature value on the multi-bit input 23 for an angle value determined by the decoder 58.

The function of the arrangement will be explained in its context. In operation of the internal combustion engine 1, as a function of the rotation of the crankshaft 2, during each rotation a reference pulse on the line 10 and angle pulses on the line 11 occur. The reference pulse resets the angle address counter 20 to zero via the reset input 21. The angle pulses appearing on the counting input 32 are counted in the angle address counter 20. The reference pulse is also applied on the unblocking input 33 of the hold circuit 55 so that the hold circuit 55 gates all the address signals to the correction value memory 22.

The decoder 58 recognizes the first angle addresses and activates corresponding transfer lines. When the corresponding angle addresses occur, the preset values, stored in the correction value memory 22, are transferred into the trigger counter 15 or the time basis counter 28, respectively. Some of the angle addresses stored in the correction value memory 22 are not used for correction. These addresses therefore may be used to store other signals, such as closing angle, thrust and the like. In the case of a further angle address the enable-input 26 of the time basis counter 25 is energized so that now the clock pulses on the counting input 49 are counted. A signal from the time basis counter 25 is applied to the enable input 35 of the counter 15. During the continuance of the time basis a N-bit pressure signal is operable on the multi-bit input 23.

According to the angle address values on the output of the angle address counter 20 and according to the pressure values, which appear on the multi-bit input 23, the address places of the correction value memory 22 are recalled. The correction values are taken over in each case into the multiplexer 28. According to the signal values on the selection line 37 the selection of a 2-bit group from the correction value is effected. After that the output signals on the lines 30 are kept ready. The angle pulses multiplied accordingly, either omitted, single, doubled, fourfold, or in another multiplicity, are counted in the trigger counter 15 according to the desired characteristic lines.

With the expiration of the time basis the level of the output signal of the time basis counter 25 changes. The rear edge of this time basis signal will become effective on the inhibiting input of the hold circuit 55 so that this hold circuit 55 keeps the angle address applied at the moment or, possibly, the last angle address No. 127.

After the expiration of the time basis the pulse multiplier 13 is stopped, and the angle pulses are counted singly further in the trigger counter 15, until the trigger pulse occurs by the overflow value of the trigger counter 15. During this period of time in the decoder 58 the angle address interval for the conversion of the analog temperature value is detected. A signal on the line 63 switches through, via the gate 70, the analog temperature value to the D/A converter 64. After the conversion into a N-bit signal same is taken over into the hold-circuit 66. At the end of the specific angle address interval the output of the hold circuit is applied on the multi-bit input 23. The highest-order address line carries, due to the further counting, a H-level so that now the memory place is addressed according to the angle address and/or the speed and the temperature, respectively. A bit group, in this case a N-bit group of the stored correction signal, is transferred as preset value into the pulse delay counter 53. Consequently, the pulse delay time is altered by the correction values according to the rotational speed of the crankshaft and the temperature of the engine as described above.

Finally, the trigger pulse on line 19 triggers the enable-input of the pulse delay counter 53. Now, on the counting input of the pulse delay counter 53, a number of angle pulses, equal to the preset value, are counted, till the output pulse appears and energizes the ignition circuit 8.

In the further course of the working cycle, in the decoder 58, an angle address interval for the conversion of the pressure value is detected. The gate 69 gates, under the control of the pulse on the line 62, the analog pressure value to the A/D converter 64. The digital pressure value is taken over into the hold-circuit 65 and is applied to the multi-bit input 23, during the remaining portion of the working cycle and also during the continuance of the time basis.

The decoder 29 takes over a bit-group of the temperature correction signal and holds ready a selection signal for the multiplexer 28. The decoder 29 may be activated also from an external circuit.

Thus, during every working cycle a speed-dependent and pressure-dependent correction and, in addition, a speed-dependent and temperature-dependent correction of the ignition time is effected.

We claim the following:

1. An ignition timing control system for an internal combustion engine which includes a crankshaft comprising:
    means for generating signals representative of the angular position of the crankshaft with respect to the engine;
    means for generating signals representative of the angular speed of the crankshaft;
    means for generating signals representative of a plurality of engine parameters;
    means responsive to said crankshaft angular position signal generating means for generating an ignition signal;
    means responsive to said angular position generating signal for generating a signal representative of a determined time period which is initiated when the crankshaft is at a predetermined angular position;

first altering means responsive to said engine parameter signals generating means for altering the time at which said ignition signal is generated during said time period as a function of one or more engine parameters; and second altering means responsive to said engine parameter signals generating means for altering the time at which said ignition signal is generated after said predetermined time period has expired as a function of one or more engine parameters.

2. An ignition timing control system as recited in claim 1, wherein said engine parameter signals include a temperature signal.

3. An ignition timing control system as recited in claim 1, wherein said signals representative of engine parameters include a pressure signal.

4. An ignition timing control system for an internal combustion engine including a crankshaft comprising:

means for generating signals representative of the angular position of the crankshaft with respect to the engine;

means for generating signals representative of the angular speed of the crankshaft;

means for generating signals representative of a plurality of engine parameters;

means responsive to said crankshaft angular position signal generating means for generating an ignition signal;

means responsive to said engine parameter signals generating means and said crankshaft angular speeds generating means for altering the time at which the ignition signal is generated as a function of both the speed of the engine and an engine operating parameter; and means responsive to said engine parameter signals generating means for further altering the time at which the ignition pulse is generated solely as a function of an engine operating parameter.

5. An ignition timing control system for an internal combustion engine which includes a crankshaft comprising:

means for generating signals representative of the angular position of the crankshaft with respect to the engine;

means for generating signals representative of the angular speed of the crankshaft;

means for generating signals representative of a plurality of engine parameters;

means responsive to said crankshaft angular position signal generating means for generating an ignition signal;

means responsive to said angular position generating signal for generating a signal representative of a determined time period which is initiated when the crankshaft is at a predetermine angular position;

first altering means responsive to said engine parameter signals generating means and effective during said time period for altering the time at which said ignition signal is generated as a function of one or more engine parameters; and second altering means responsive to said engine parameter signals generating means and effective after said predetermined time period has expired for altering the time at which said ignition signal is generated as a function of one or more engine parameters.

* * * * *